United States Patent
Newstadt et al.

(10) Patent No.: US 10,154,136 B1
(45) Date of Patent: Dec. 11, 2018

(54) CALL BLOCK POLICY USING VALIDATED IDENTITIES AND SELECTED ATTRIBUTE SHARING

(71) Applicant: SYMANTEC CORPORATION, Mountain View, CA (US)

(72) Inventors: Keith Newstadt, West Newton, MA (US); Ilya Sokolov, Boston, MA (US)

(73) Assignee: Symantec Corporation, Mountain View, CA (US)

( * ) Notice: Subject to any disclaimer, the term of this patent is extended or adjusted under 35 U.S.C. 154(b) by 120 days.

(21) Appl. No.: 15/076,957

(22) Filed: Mar. 22, 2016

(51) Int. Cl.
- *H04M 3/436* (2006.01)
- *H04M 1/663* (2006.01)
- *H04M 3/42* (2006.01)

(52) U.S. Cl.
CPC ......... *H04M 3/4365* (2013.01); *H04M 1/663* (2013.01); *H04M 3/42068* (2013.01); *H04M 3/42161* (2013.01)

(58) Field of Classification Search
CPC .................. H04M 3/4365; H04M 3/42068
See application file for complete search history.

(56) References Cited

U.S. PATENT DOCUMENTS

| | | | |
|---|---|---|---|
| 6,324,271 B1 * | 11/2001 | Sawyer | H04M 1/57 379/142.04 |
| 7,042,997 B2 | 5/2006 | Jones | |
| 8,280,020 B2 * | 10/2012 | Vinokurov | H04L 63/08 379/142.05 |
| 8,351,590 B2 | 1/2013 | Guven | |
| 8,577,001 B2 | 11/2013 | Orr et al. | |
| 2004/0066916 A1 * | 4/2004 | Brown | H04M 3/42 379/88.01 |

* cited by examiner

*Primary Examiner* — Nafiz E Hoque
(74) *Attorney, Agent, or Firm* — Meyertons Hood Kivlin Kowert and Goetzel PC; Rory D. Rankin

(57) ABSTRACT

Systems, apparatuses, methods, and computer readable mediums for implementing a flexible call blocking scheme using validated identities and selected attribute sharing. A user may undergo an identity verification process to generate one or more signed attributes associated with the user. When the user initiates a phone call, the user may select which attributes to expose to the callee. In one embodiment, the user's device may prevent the user's phone number from being exposed to the callee. The selected attributes may be sent to the callee, and then the device of the callee may compare the selected attributes to preconfigured rules. If the preconfigured rules indicate the selected attributes of the caller meet one or more criteria, then the call may be allowed to ring the device of the callee. Otherwise, the call may be blocked.

20 Claims, 10 Drawing Sheets

Select which Attributes to Share with Callee

Default Settings ☐ ~210
Select Individual Attributes to Share ☒ ~215

205

☐ ☐ ☒ ☐ ☐ ☒ ☐ ☐ ☐ • • •

Primary Telephone Number
Secondary Telephone Number
Name
Business Name
Business Category
Affiliated Organization
Profession
Work Address
Home Address
Call Priority

CALL BLOCK POLICY USING VALIDATED IDENTITIES AND SELECTED ATTRIBUTE SHARING

BACKGROUND

Technical Field

Embodiments described herein relate to telecommunications and more particularly, to implementing a call-block policy using validated identities and shared attributes.

Description of the Related Art

In an age of ubiquitous mobile phones, unwanted phone calls continue to be a nuisance. Telemarketers, pollsters, and wrong numbers distract people, wake them up, and cause interruptions at inconvenient times. This problem has grown more acute in a time of cheap outsourced call centers and robocalling, combined with mobile phones which people tend to carry with them at all times, with some mobile phones charging per incoming call, and with mobile phones increasingly being used as a person's only phone in this new generation of cord cutting.

The existing solutions to this problem have so far generated fairly poor results. For example, the National Do Not Call Registry established by the United States government to allow telephone users to indicate they do not wish to receive unsolicited telephone calls is not well enforced and, even when respected, only eliminates a portion of the total number of unwanted calls. Call blocking techniques also generally do a poor job of identifying which calls are desired and which are not. For example, some applications (or "apps") allow users to create "whitelists" that identify phone numbers that are permitted to call the user (i.e., "good callers"). These whitelisted numbers may be based on numbers programmed into the phone's address book or otherwise specifically identified by the receiver of the call. However, such approaches tend to block too many calls as they generally require users to specifically identify every number permitted to call the user. Consequently, if a call to a user is made from a person using a number not in the whitelist and the user would otherwise allow that person to call them, the user will be inaccessible to desired, necessary or even emergency phone calls. For example, suppose a person calls their child's doctor after hours. The person leaves a message with the doctor's answering service, asking for a return call. The doctor calls the person back, not from the answering service's number or from the clinic's external number, but from a different number such as his personal phone extension or from his cell phone. Assuming this different number is not in their whitelist, the doctor's call may be rejected.

Conversely, some approaches use "blacklists" to identify phone numbers from which a caller does not want to receive calls. However, blacklists do not tend to block enough calls and do not stop telemarketers who frequently change the phone number from which they call.

In view of the above, improved methods and mechanisms are desired for allowing and/or blocking communications such as telephone calls.

SUMMARY

Systems, apparatuses, and methods for implementing a call-blocking policy with validated identities and attribute sharing are disclosed.

In one embodiment, a system may implement a flexible call blocking policy on signed identity attributes rather than on limited and spoofable source phone numbers. The system may validate the identity and attributes of various users. The system also allow users to select which attributes are shared with a called party (or callee) when voice calls are initiated. The called party may also specify which rules should be applied to block or allow incoming voice calls.

Initially, a user may go through an identity verification process. The process may be manual or automated, depending on the embodiment. The identity verification process may produce a set of signed and validated attributes such as name, primary phone number, business name, business category, affiliated institution, and/or one or more other attributes. In one embodiment, the attributes may be signed by a known trusted attribute validation service.

Then, when the user makes a phone call, the user can select which attributes are exposed to the callee. Depending on the embodiment, the user may use a minimum set of attributes, manually override the attributes on a call-by-call basis, configure attributes per address book entry, and so on. When the user initiates the phone call, the selected attributes may be sent to the callee. The attributes may be sent on the same connection as the phone call or the attributes may be sent on a separate connection from the phone call. The attribute signatures may be validated by the callee's mobile device or by the mechanism that transmits the attribute signatures from the caller to the callee.

The callee may have a call blocking mobile app installed on their mobile device. When the callee's mobile device receives the phone call, the call blocking mobile app may retrieve the caller's attributes. The call blocking mobile app may then compare those attributes against preconfigured rules. If the attributes satisfy the conditions specified by the preconfigured rules, the call may be allowed. Otherwise, if the attributes do not satisfy the conditions specified by the preconfigured rules, the call may be blocked.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 2 illustrates one embodiment of a user interface window that may be generated by a telephony or computing device.

DETAILED DESCRIPTION OF EMBODIMENTS

Figure 1:
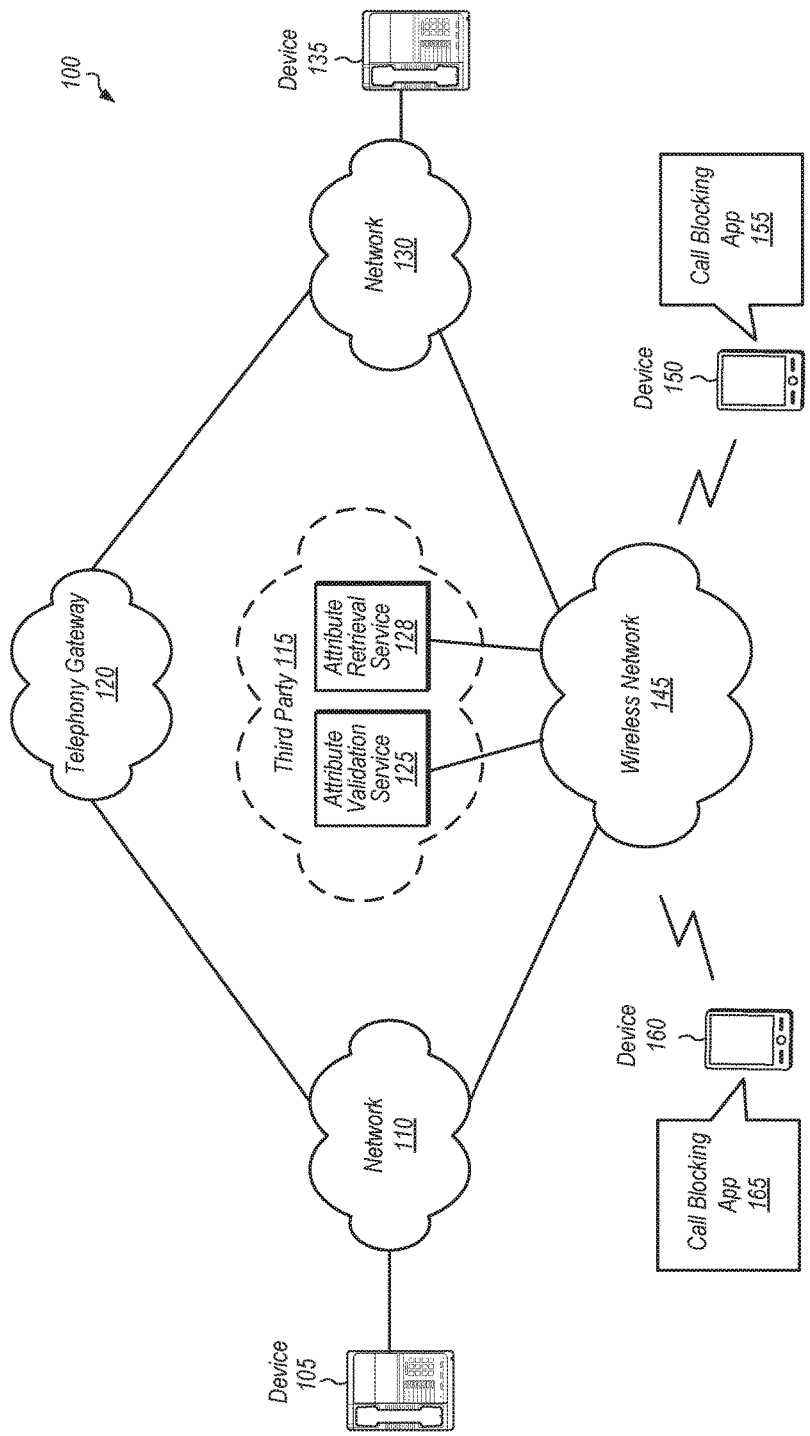
FIG. 1 is a block diagram of one embodiment of a system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology

The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a processor . . . ." Such a claim does not foreclose the system from including additional components (e.g., a display unit, a storage unit).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram of one embodiment of a system 100 for implementing a flexible call blocking policy using validated identities and selected attribute sharing is shown. System 100 may include at least devices 105, 135, 150, and 160, networks 110 and 130, third party 115, attribute validation service 125, attribute retrieval service 128, wireless network 145, and telephony gateway 120. While attribute validation service 125 and attributes retrieval service 128 are shown as part of a singular third party 115, this need not be the case. Rather, each of the services may be separate and distinct services that are owned and/or operated independently from one another. Either or both may also be part of a cloud based service. Devices 105 and 135 may be any type of fixed or mobile telephone device. For example, each of devices 105 and 135 may be a mobile device, a computer with a VoIP software application, a stationary telephony device, or other suitable device with processor hardware configured to execute one or more software applications. As used herein, the term "telephony device" refers to any device capable of receiving a call—whether that device be a smart phone, tablet computer, desktop computer, or otherwise. Similarly, devices 150 and 160 may be any type of mobile telephony or computing device. In various embodiments, devices 105 and 135 may be connected to networks 110 and 130, respectively, via a landline (e.g., copper, fiber) using Ethernet, fiber channel, or a modem connected to plain old telephone service (POTS) or via a wireless connection, while devices 150 and 160 may be configured to connect wirelessly to wireless network 145.

Wireless network 145 may be configured to support a plurality of mobile devices (e.g., devices 150 and 160). In various embodiments, wireless network 145 may be a wireless access and transport network, such as a cellular network (e.g., 3G, 4G), IEEE 802.11, satellite network, or other type of wireless network. Depending on the embodiment, wireless network 145 may utilize various mobile communication technologies including, for example, in cellular networks, global system for mobile communications/universal mobile telecommunication system (GSM/UMTS) technologies and/or code division multiple access (CDMA) technologies. Networks 110 and 130 may be any type of network or combination of networks, including a local area network (LAN), metropolitan area network (MAN), wide area network (WAN), a Public Switched Telephone Network (PSTN), an Intranet, the Internet, a cable network, a packet-switched network, a fiber-optic network, or other type of network. Examples of LANs include Ethernet networks, Fiber Distributed Data Interface (FDDI) networks, and token ring networks. In one embodiment, network 110 may be coupled to network 130 via telephony gateway 120.

In one embodiment, one or more of the users of devices 105, 135, 150, and 160 may undergo an identity verification process using attribute validation service 125 hosted by third party 115. In various embodiments, third party 115 is representative of any type of a cloud computing platform which may be provided by a web services provider. The identity verification process may be a manual process or may be an automated process, depending on the embodiment. At the end of the process, a user may have a set of signed and validated attributes such as name, primary phone number, business name, business category, affiliated institution, etc. which the user may then store on their telephony or computing device.

Then, when a user initiates a phone call using their telephony or computing device, the user may select which attributes are exposed to the callee. The user may also be allowed to block at least one attribute from being exposed to the callee. For selecting which attributes to expose to the callee, the user may use a minimum set of attributes, manually override predetermined attributes per call, configure attributes per address book entry, etc. These selected attributes may then be sent to the callee. The attributes may be sent on the same connection as the phone call, for example via the same protocol that caller-ID is delivered on, via modem signal on a connection, etc. Alternatively, the attributes may be sent on a separate connection, for example via the Internet and/or using mobile push capabilities. For example, in one embodiment, the attributes may be sent to attribute retrieval service 128, and then the callee may retrieve these attributes from attribute retrieval service 128.

When the callee receives the attributes from the caller (or from attribute retrieval service 128), since the attributes have been signed by a known trusted, third-party attribute validation service 125, the callee may have confidence that these attributes are valid. The signatures may be validated by callee's device or by the mechanism that transmits the attributes from the caller to the callee. It may be assumed for the purposes of this discussion that the callee is device 150 or device 160. Device 150 may be configured to execute call blocking app 155 and device 160 may be configured to execute call blocking app 165.

Prior to device 150 or 160 beginning to ring or provide some other user discernible indication, the call blocking app installed on the device may retrieve the attributes from the caller (or from attribute retrieval service 128) and then the call blocking app may compare these attributes against preconfigured rules. For example, in one embodiment, the callee may select to only allow calls from users that are in the address book of the callee's device. This may apply to a caller even if the caller is calling from a different phone number than the one listed in the callee's address book for that caller. Alternatively, in another embodiment, the callee may select to only allow calls from medical providers. In a further embodiment, the callee may select to allow only calls from other people from the same institution or company as the callee. In other embodiments, the callee may specify other types of rules to determine which calls will be allowed to cause the callee's device to ring. For example, the user may define one or more categories for use in classifying callers according to one or more common characteristics. For example, categories could be created for educational institutions, medical establishments, law enforcement agencies, and so on. Such categories may represent calls that are permitted. Similarly, categories may be established for calls that are not permitted. For example, categories could be established for political organizations, polling organizations, and so on. In this manner, the user may be able to more easily permit or block larger categories of callers. If the attributes sent by the caller meet the rules specified by the callee, then the call blocking app (e.g., call blocking app 155 or 165) may allow the call to ring the device of the callee. Otherwise, if the attributes sent by the caller do not meet the rules specified by the callee, then the call blocking app may block the call. In various embodiments, providing or generating a user discernible indication may include providing an audible indication (e.g., a ring, tone, music, etc.), providing a visual indication (e.g., popup on a display screen, a graphic message, symbol, flashing light, etc.), a tactile indication (e.g., vibration), or otherwise.

It should be understood that system 100 is indicative of one embodiment of a system 100 for implementing the techniques described herein. In other embodiments, system 100 may include other numbers of devices, networks, and/or may be organized in a different manner. It is also noted that the mechanisms and methods described herein may be utilized with other types of communications beside voice or phone calls. For example, the techniques may be utilized with text messages, short message service (SMS) messages, video calls (e.g., via Skype® or Facetime®), emails, and other forms of communications involving any type of message being conveyed from a sending party to a receiving party.

Turning now to FIG. 2, one embodiment of a user interface window 205 that may be generated by a telephony or computing device is shown. In one embodiment, user interface window 205 may be generated by a device to allow a calling party to determine which attributes to send to a called party to when the calling party is attempting to make a phone call to the called party. A calling party may specify a set of default attributes which are sent to a calling party if the calling party does not specify the attributes on a call-by-call basis. For example, if the calling party selects option 210, then the default set of attributes may be exposed to the callee.

User interface window 205 may also include an option 215 which allows the calling party to individually select the attributes which are exposed to the callee. As shown in window 205, option 215 has been selected by the calling party. A set of individual attributes are shown in the bottom part of window 205 which may be selected or not selected by the calling party. It should be understood that the individual attributes shown in the bottom part of window 205 are merely indicative of one embodiment. In other embodiments, the set of individual attributes may include other numbers and types of attributes for potentially sharing with the callee.

The individual attributes shown in window 205 include a primary telephone number, a secondary telephone number, a name, business name, business category, affiliated organization, profession (e.g., doctor), work address, home address, and call priority. In other embodiments, additional attributes may be selected for sharing, such as previous address, previous employer, and so on. As shown in window 205, the name and affiliated organization attributes have been selected. After the calling party has selected the individual attributes in window 205, the device of the calling party may utilize these selections to determine which attributes to share with the callee when making the phone call to the callee. A call blocking application on the telephone or computing device of the callee may then determine whether or not to accept the call depending on the attributes which are shared with the callee and whether these attributes meet one or more preconfigured rules.

Figure 3:
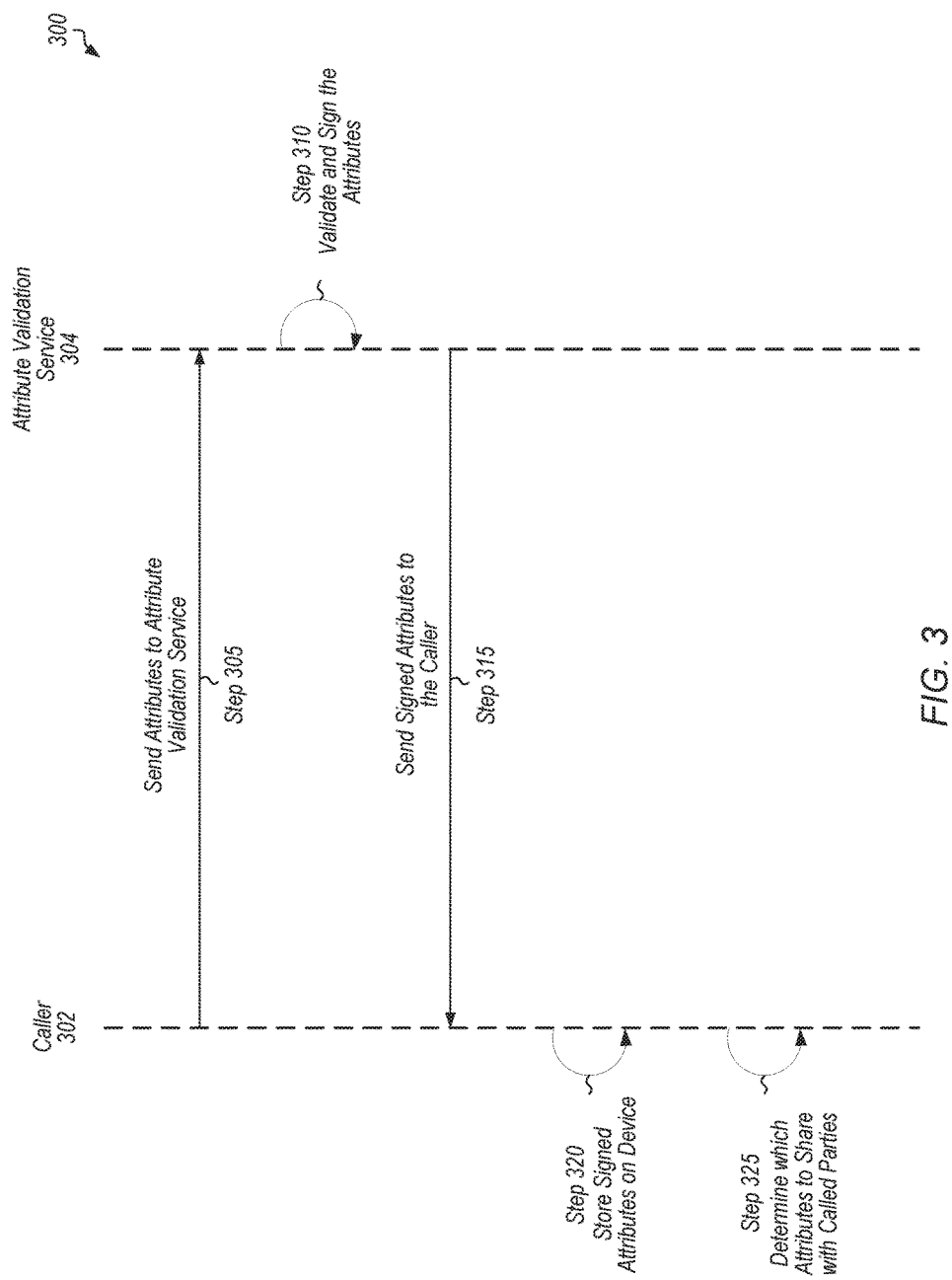
FIG. 3 is a sequence diagram of one embodiment of performing an identity proofing process.

Referring now to FIG. 3, a sequence diagram 300 of one embodiment of a sequence of events for performing an identity proofing process is shown. A first step 305 of sequence diagram 300 may involve a caller 302 sending attributes to attribute validation service 304. Caller 302 may initiate step 305 to go through an identity proofing process to obtain signed attributes that will allow caller 302 to call or communicate with other parties who require identity proofing prior to receiving calls. In one embodiment, a software application running on a device of caller 302 may collect and/or retrieve attributes and convey these attributes to attribute validation service 304.

After caller 302 sends attributes to attribute validation service 304 in step 305, attribute validation service 304 may validate and sign the attributes in step 310. Any suitable technique for signing the attributes may be used in step 310. For example, in one embodiment, signing the attributes may involve generating an encrypted hash of each attribute. Other embodiments may utilize other mechanisms for signing attributes. It may be assumed for the purposes of this discussion that caller 302 was successfully validated in step 310. If, for some reason, attribute validation service 304 was unable to successfully validate caller 302, attribute validation service 304 may be configured to generate and send an error message to caller 302. Next, attribute validation service 304 may send the signed attributes to caller 302 in step 315. In response to receiving the signed attributes, caller 302 may store the signed attributes on their telephony or computing device in step 320. Then, caller 302 may determine which attributes to share with called parties in step 325. For example, caller 302 may program a default policy for determining which attributes to share with parties called by caller 302. Caller 302 may also be able to select attributes for calls on an individual basis. In some embodiments, caller 302 may define separate attribute sharing policies for separate categories of call recipients.

Figure 4:
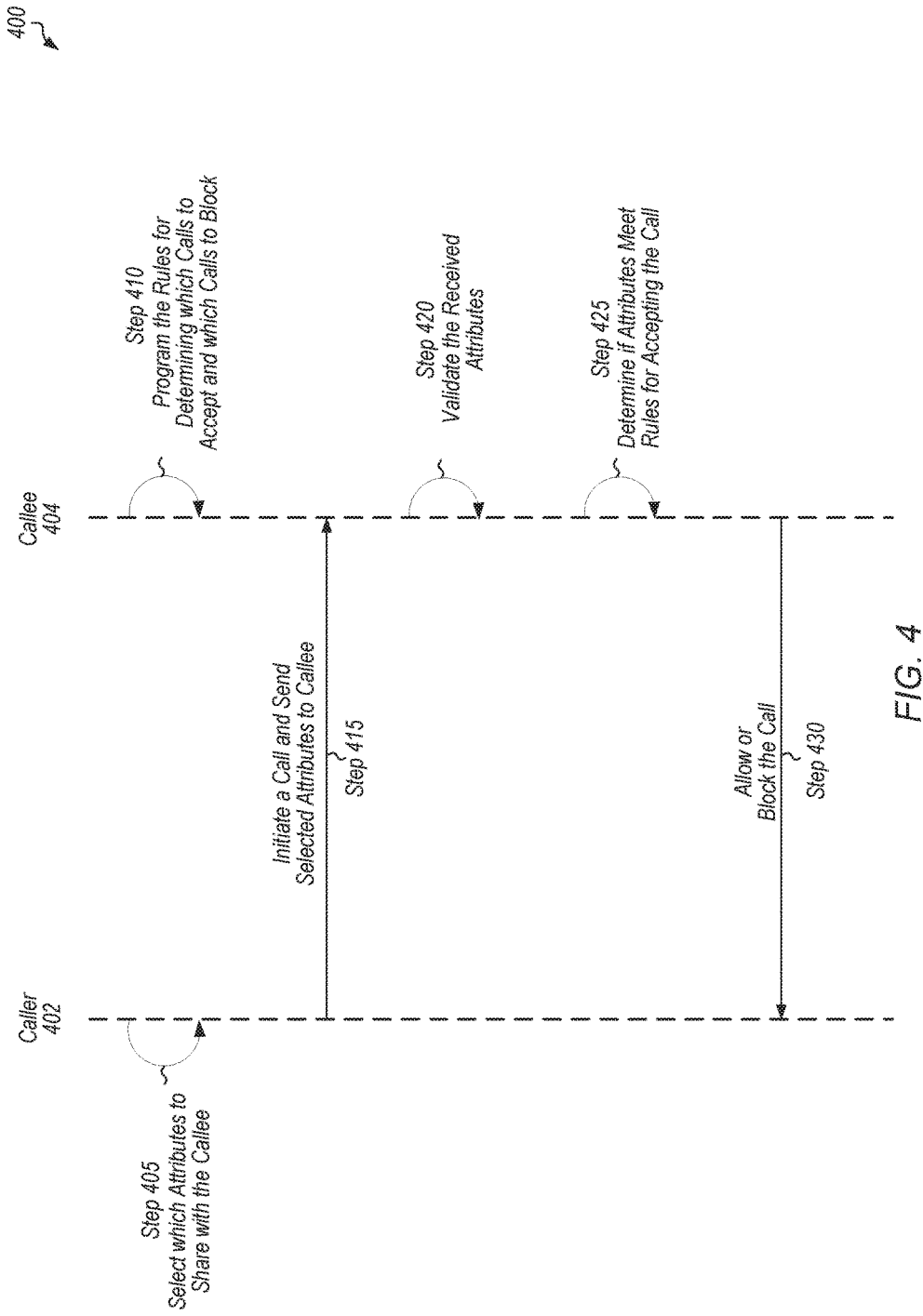
FIG. 4 is a sequence diagram of one embodiment of implementing a flexible call blocking policy.

Turning now to FIG. 4, a sequence diagram 400 of one embodiment of a sequence of events for implementing a flexible call blocking policy is shown. In step 405, caller 402 may select which attributes to share with the callee. In step 410, callee 404 may program the rules for determining which calls to accept and which calls to block. In one embodiment, the rules in step 410 may specify which attributes are required for accepting a call from a calling party.

Next, in step 415, caller 402 may initiate a call to callee 404 while also sending the one or more selected attributes to callee 404. In step 420, callee 404 may validate the attributes received from caller 402. In one embodiment, callee 404 may use an encryption key to decrypt signatures of the attributes so as to validate the attributes. Alternatively, in another embodiment, the signatures of the attributes may be validated by the mechanism that transmits the signed attributes from caller 402 to callee 404. It may be assumed for the purposes of this discussion that callee 404 was able to successfully validate the received attributes. Otherwise, callee 404 may block the call if callee 404 is unable to validate the received attributes.

In step 425, callee 404 may determine if the received attributes meet the rules for accepting the call. For example, the rules programmed by callee 404 may specify that only calls from medical providers may be accepted, only calls from family members may be accepted, only calls from people from a particular institution may be accepted, and/or one or more other conditions. If the attributes meet the rules for accepting the call, then in step 430, callee 404 may allow the call from caller 402. Alternatively, if the attributes do not meet the rules for accepting the call, then callee 404 may block the call in step 430. The telephony or computing device of the callee 404 may generate a log or report of blocked calls that can be reviewed at a later point in time by callee 404. When reviewing the log, callee 404 may be able to generate an indication that a blocked call should have been allowed, and this indication may be utilized by the telephony or computing device to update the rules for blocking calls. In one embodiment, the telephone or computing device may be configured to create a new rule in response to callee 404 indicating a blocked call should have been allowed, with the new rule specifying that future calls from callers with equivalent attributes should be allowed. Alternatively, the device may prompt the user for input as to whether the new rule should be created and enforced for future incoming calls.

Figure 5:
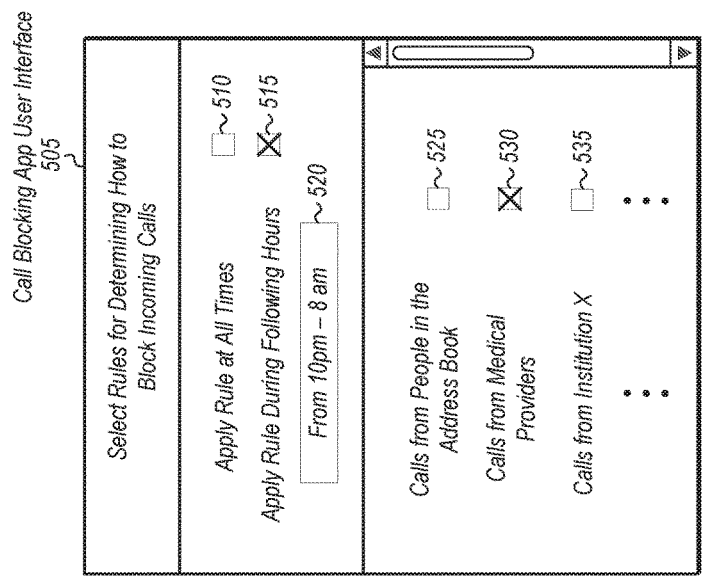
FIG. 5 illustrates one embodiment of a call blocking app user interface.

Referring now to FIG. 5, one embodiment of a call blocking app user interface 505 is shown. In one embodiment, user interface 505 may be generated by a call blocking app. A call blocking app is representative of any type of software application or program which may execute on a mobile device, telephone device, or other computing device for blocking incoming calls according to one or more rules.

In one embodiment, user interface 505 may include an option 510 for selecting to apply the rules at all times. User interface 505 may also include an option 515 for allowing a user to select to apply the rules only during specified hours, with the hours specified in box 520. A user may specify any number of sets of rules to be applied at different times of the day, different days of the week, on weekends, holidays, etc. A user may also specify any number of sets of rules to apply to different types of calling parties and/or different types of received attributes.

User interface 505 may also include options for selecting which rules to apply to incoming calls received by the telephony or computing device. For example, in one embodiment, user interface 505 may include box 525 for selecting whether to allow calls from people already identified in the address book of the telephony or computing device. It is noted that a person in the address book may be associated with a first telephone number but the person may utilize a second telephone number when making a call. However, the call blocking app may be able to correctly identify the person using the attributes sent during initiation of the call even though the person is using a different telephone number form the one stored in the address book.

User interface 505 may also include box 530 for selecting whether to allow calls from people identified as medical providers. Box 530 is shown as being selected in user interface 505. User interface 505 may also include box 535 for selecting whether to allow calls from people from institution 'X', which is representative of any type of institution (e.g., company, organization). User interface 505 may also include any number of other rules and/or options for applying additional conditions to received calls. It should be understood that the rules and options shown in user interface 505 for applying to incoming calls are indicative of one embodiment. In other embodiments, other rules and/or options for applying to incoming calls may be utilized with other types of user interfaces.

Figure 6:
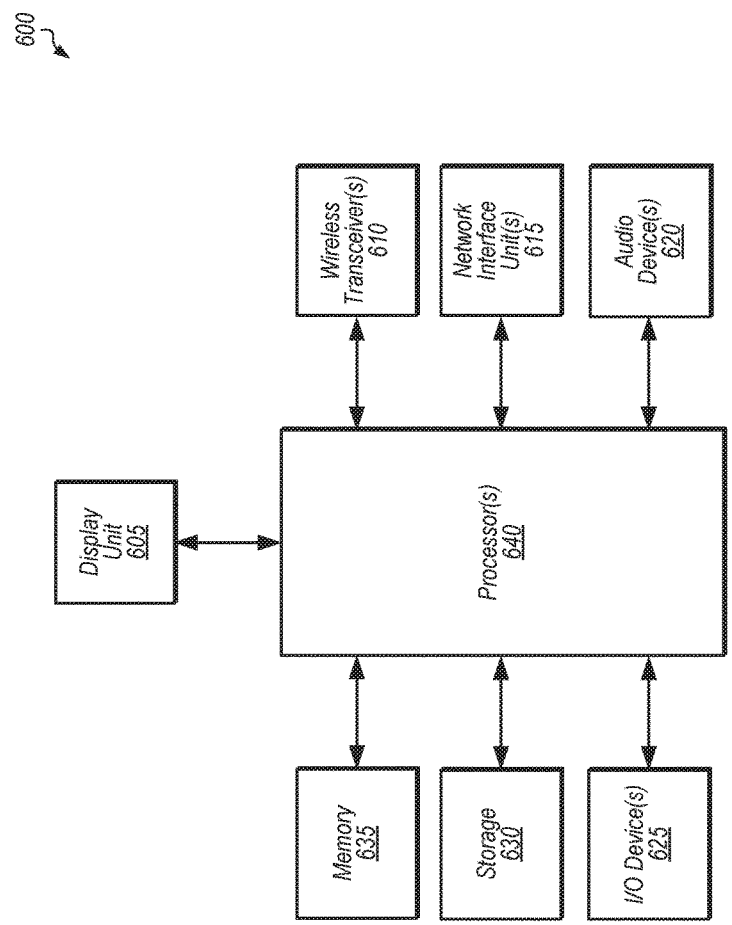
FIG. 6 is a block diagram of one embodiment of a device.

Turning now to FIG. 6, a block diagram of one embodiment of a device 600 is shown. Device 600 may be a telephony or computing device, depending on the embodiment. In one embodiment, device 600 may be a battery powered mobile phone. Device 600 may include display unit 605, wireless transceiver(s) 610, network interface unit(s) 615, audio device(s) 620, input/output (I/O) device(s) 625, storage 630, memory 635, and processor(s) 640. In other embodiments, device 600 may include other components and/or may be organized in other suitable manners.

Display unit 605 may include a display control unit coupled to a display device for showing images and videos to the user. Display unit 605 may generate a graphical user interface to the user to allow the user to interact with and/or control the operation of device 600. Wireless transceiver(s) 610 may include a wireless cellular telephony transceiver, WiFi transceiver, Bluetooth transceiver, and/or other types of transceivers or components. Network interface unit(s) 615 may include a modem, local area network (LAN) port, and/or other components for coupling device 600 to a data or phone network.

Audio device(s) 620 may include one or more of a speaker, headphone jack, microphone, microphone jack, and/or other types of audio or I/O connections. I/O device(s) 625 may include a keyboard, touchpad, universal serial bus (USB) interface, battery charging interface, and/or other types of I/O devices, interfaces, or connectors. Storage 630 may include one or more storage devices for storing data and/or instructions. Memory 635 may include one or more memory devices for storing data and/or instructions. Storage 630 and memory 635 are representative of non-transitory computer readable storage media usable for storing program instructions which when executed may cause device 600 to implement the various methods and techniques described herein.

Processor(s) 640 is representative of any number and type (e.g., CPU, GPU) of processing units. Processor(s) 640 may also include memory device(s) (e.g., one or more caches) for storing instructions for execution and other data. Processor(s) 640 may be configured to execute instructions, software, an operating system, software application(s), and/or other types of commands, processes, and threads, depending on the embodiment. Processor(s) 640 may be coupled to display unit 605, wireless transceiver(s) 610, network interface unit(s) 615, audio device(s) 620, input/output (I/O) device(s) 625, storage 630, and memory 635.

Figure 7:
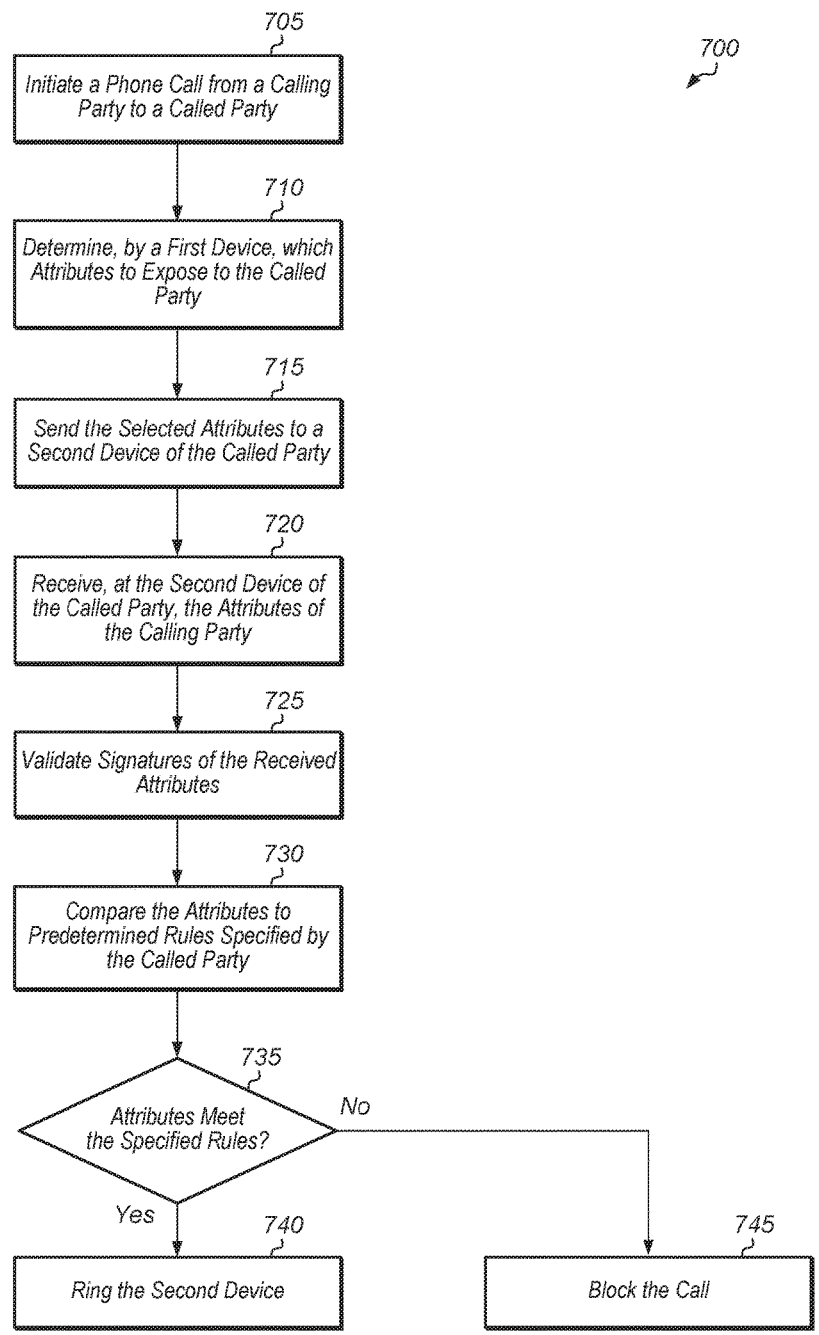
FIG. 7 is a generalized flow diagram illustrating one embodiment of a method for implementing a flexible call blocking policy.

Referring now to FIG. 7, one embodiment of a method 700 for implementing a flexible call blocking policy is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices, apparatuses, or systems described herein may be configured to implement method 700.

A calling party may initiate a phone call to a called party (block 705). The calling party may be using a first device to initiate the phone call, and the called party may be using a second device on which the phone call is received. In other embodiments, the calling party may initiate other types of communications (e.g., text message, video call) to the called party. Next, the first device may determine which attributes to expose to the called party (block 710). It may be assumed for the purposes of this discussion that the calling party has already undergone an identity proofing process and had their attributes validated and signed by a third party entity providing an attribute validation service (e.g., attribute validation service 125 of FIG. 1). Depending on the embodiment, any of various techniques may be utilized for determining which attributes to expose to the called party. For example, in one embodiment, the first device may utilize a default set of attributes. In another embodiment, the first device may allow the user to manually override the attributes on a per-call basis. In a further embodiment, the first device may configure which attributes to share for each address book entry on an entry by entry basis.

Next, the first device may send the selected attributes to the second device of the called party (block 715). Then, the second device of the called party may receive the attributes of the calling party (block 720). After receiving the attributes, the second device may validate the signatures of the received attributes (block 725).

Next, the second device may compare the attributes to predetermined rules specified by the called party (block 730). For example, the predetermined rules may specify that only calls from callers that are in the address book of the callee may be allowed. Alternatively, the predetermined rules may specify that only calls from medical providers may be allowed. Still further, the predetermined rules may specify that only calls from callers working for the same company as the callee may be allowed. Other examples of rules specifying which calls may be allowed are possible and are contemplated. Then, the second device may determine whether to allow the call based on the comparison of the attributes to the specified rules (conditional block 735).

If the attributes of the call meets the specified rules (conditional block 735, "yes" leg), then the second device may be configured to ring to alert the called party of the incoming phone call (block 740). If the attributes do not meet the specified rules (conditional block 735, "no" leg), then the call may be blocked (block 745). After blocks 740 and 745, method 700 may end.

Figure 8:
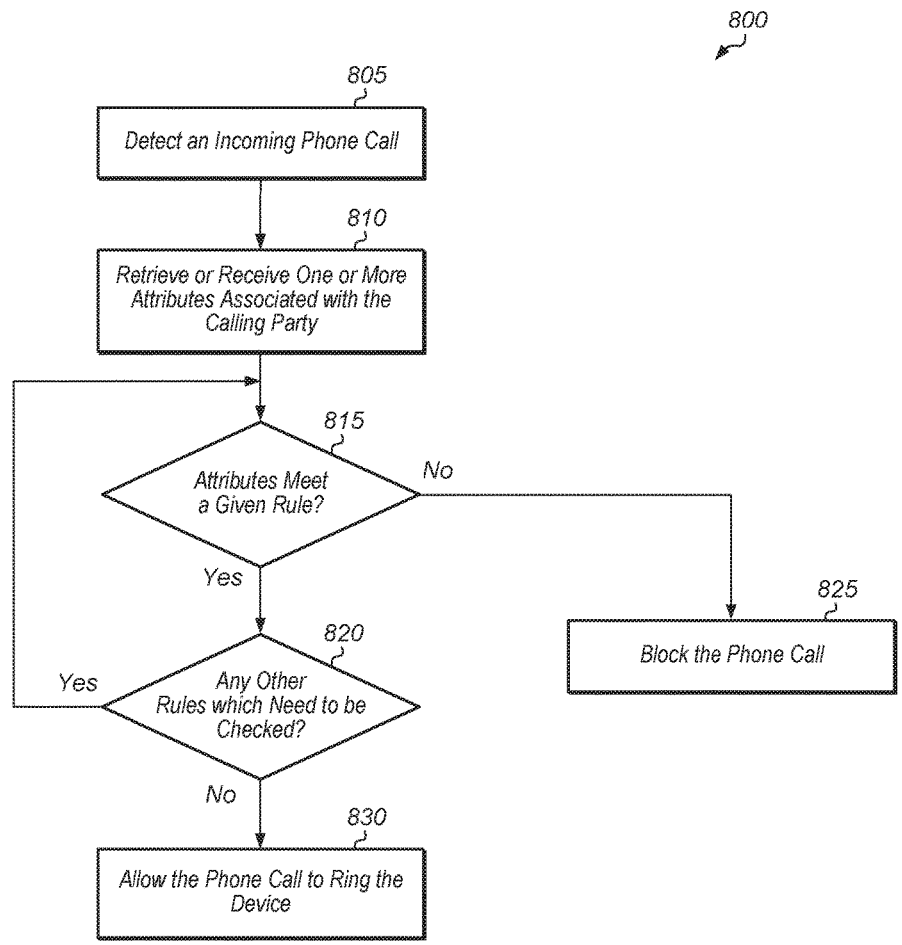
FIG. 8 is a generalized flow diagram illustrating another embodiment of a method for implementing a flexible call blocking policy.

Turning now to FIG. 8, another embodiment of a method 800 for implementing a flexible call blocking policy is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices, apparatuses, or systems described herein may be configured to implement method 800.

A device may detect an incoming phone call (block 805). The device may be any type of telephony or computing device which is capable of receiving phone calls. In response to receiving the incoming phone call, the device may be configured to retrieve or receive one or more attributes associated with the calling party who initiated the phone call (block 810). The one or more attributes may include attributes other than the source telephone number of the calling party who initiated the phone call.

The device may then determine if the attributes indicate that the phone call meets a given rule from a set of rules utilized by the device for accepting phone calls (conditional block 815). If the attributes indicate the call meets a given rule from the set of rules (conditional block 815, "yes" leg), then the device may determine if there any other rules which need to be checked (conditional block 820). For example, the device may be configured to check a plurality of rules prior to accepting a phone call. If the attributes indicate the call does not meet the given rule from the set of rules (conditional block 815, "no" leg), then the device may block the call (block 825).

If there are any other rules which still need to be checked (conditional block 820, "yes" leg), then method 800 may return to conditional block 815. If all of the rules have already been checked (conditional block 820, "no" leg), then the device may allow the phone call to ring the device (block 830). After blocks 825 and 830, method 800 may end. In other embodiments, method 800 may be implemented for other types of communications (e.g., text message, video call) besides phone calls. It is also noted that conditional blocks 815 and 820 may be performed in parallel to check multiple rules simultaneously.

Figure 9:
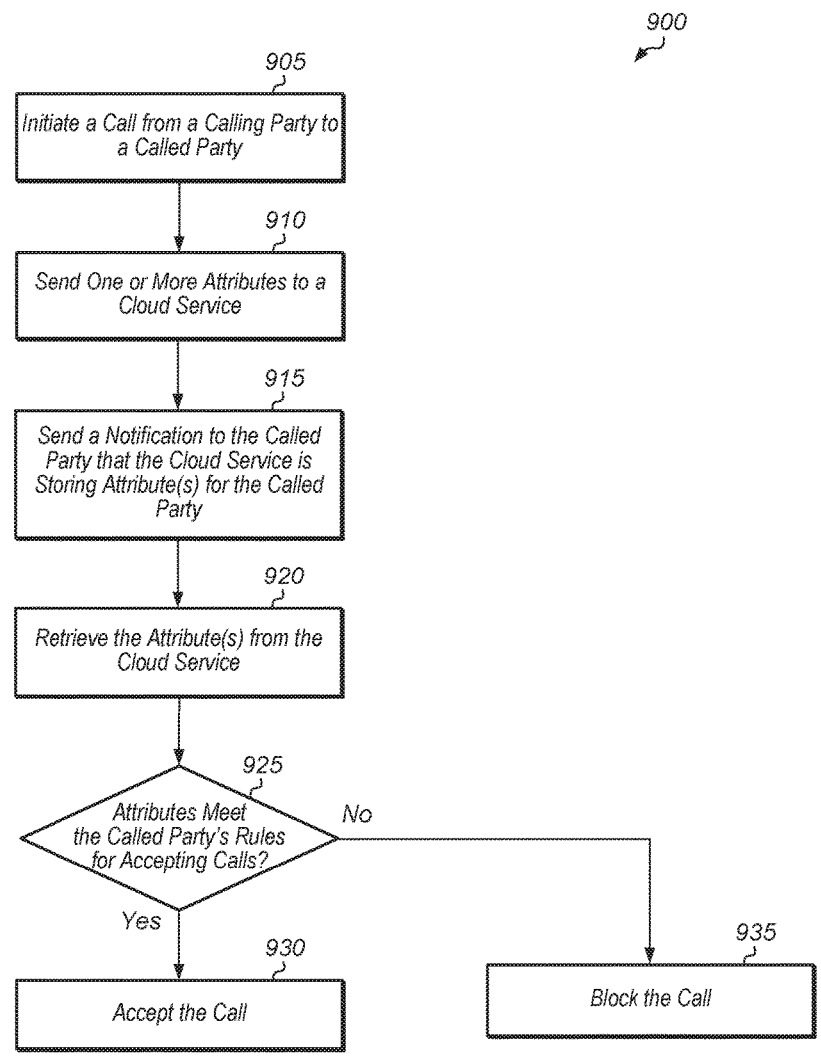
FIG. 9 is a generalized flow diagram illustrating one embodiment of a method for using an out-of-band attribute channel.

Referring now to FIG. 9, one embodiment of a method 900 for using an out-of-band attribute channel is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices, apparatuses, or systems described herein may be configured to implement method 900.

A calling party may initiate a call to a called party (block 905). In response to initiating the call, the calling party may send one or more attributes to a cloud service (block 910). The cloud service may then send a notification to the called party that the cloud service is storing attribute(s) for the called party (block 915). The called party may then retrieve the attribute(s) from the cloud service (block 920).

If the called party determines that the attributes meet the called party's rules for accepting calls (conditional block 925, "yes" leg), then the call may be accepted (block 930). If the called party determines that the attributes do not meet the called party's rules for accepting calls (conditional block 925, "no" leg), then the call may be blocked (block 935). After blocks 930 and 935, method 900 may end. It is noted that the calling party may have and/or utilize a first device, which may be a computing device and/or a telephony device. It is also noted that the called party may have and/or utilize a second device, which may be a computing device and/or a telephony device.

Figure 10:
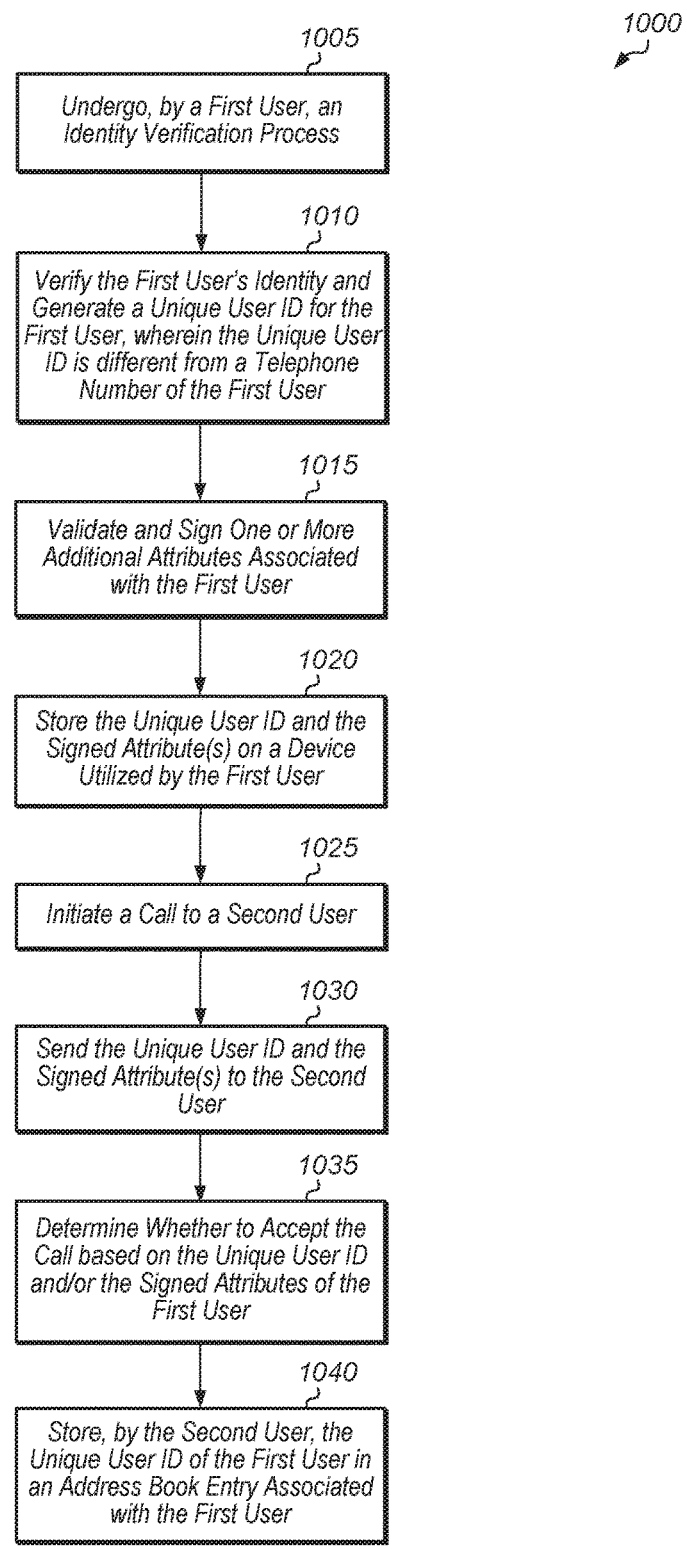
FIG. 10 is a generalized flow diagram illustrating one embodiment of a method for using unique user IDs.

Turning now to FIG. 10, one embodiment of a method 1000 for using unique user identifiers (IDs) is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices, apparatuses, or systems described herein may be configured to implement method 1000.

A first user may undergo an identity verification process (block 1005). The identity verification process may verify the first user's identity and generate a unique user ID for the first user, wherein the unique user ID is different from a telephone number of the first user (block 1010). Each user that goes through the identity verification process may be assigned a number which is different from the user IDs previously generated for all other users who have already gone through the identity verification process. The identity verification process may also validate and sign one or more additional attributes associated with the first user (block 1015). Next, the first user may store the unique user ID and the signed attribute(s) on a telephone and/or computing device utilized by the first user (block 1020). The unique user ID may or may not be signed by the identity verification process depending on the embodiment.

Then, the first user may initiate a call to a second user (block 1025). The first user may send the unique user ID and the signed attribute(s) to the second user (block 1030). Next, the second user may determine whether to accept the call based on the unique user ID and/or the signed attributes of the first user (block 1035). It is noted that the second user may choose any of the previously described techniques for determining whether to accept or block the call from the first user. Then, assuming the second user decides to accept the call from the first user, the second user may store the unique user ID of the first user in an address book entry associated with the first user (block 1040). On subsequent calls from the first user to the second user, the second user may be able to identify the first user using only the unique user ID of the first user. After block 1040, method 1000 may end.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   a memory; and
   one or more processors coupled to the memory;
   wherein the system is configured to:
      sign one or more attributes of a calling party by generating an encrypted hash of each of the one or more attributes as part of an identity verification process of the calling party;
      store the one or more signed attributes associated with the calling party;
      receive a request to establish a phone call from the calling party to a called party;
      retrieve one or more of the stored one or more signed attributes;
      send the retrieved one or more signed attributes from the calling party;
      receive the one or more signed attributes of the calling party;
      validate signatures of the one or more signed attributes responsive to receiving the one or more signed attributes of the calling party;
      compare one or more attributes of the one or more validated signed attributes to one or more rules specified by the called party;
      allow a telephony device of the called party to provide a user discernible indication of the phone call, responsive to determining the one or more attributes meet conditions specified by the one or more rules; and
      block the phone call, responsive to determining the one or more attributes do not meet conditions specified by the one or more rules.

2. The system as recited in claim 1, wherein the system is further configured to:
   prevent a phone number of the calling party from being shared with the called party; and
   identify the calling party based on the one or more attributes without using the phone number of the calling party.

3. The system as recited in claim 1, wherein the system is further configured to validate the signatures of the one or more signed attributes by decrypting the signatures.

4. The system as recited in claim 1, wherein prior to generating the request to establish a phone call from the calling party to the called party, the system is configured to:
  validate an identity of the calling party;
  allow the calling party to select which attributes to expose to the called party; and
  allow the calling party to block at least one attribute from being exposed to the called party.

5. The system as recited in claim 4, wherein a third party entity is configured to sign the one or more attributes responsive to validating the identity of the calling party.

6. The system as recited in claim 1, wherein the system is configured to generate a user interface to allow the called party to specify the one or more rules for applying to incoming phone calls.

7. The system as recited in claim 6, wherein the one or more rules comprise one or more of allowing calls from people according to defined categories.

8. A method comprising:
  signing one or more attributes of a calling party by generating an encrypted hash of each of the one or more attributes as part of an identity verification process of the calling party;
  storing the one or more signed attributes associated with the calling party;
  receiving a request to establish a phone call from the calling party to a called party;
  retrieving one or more of the stored one or more signed attributes;
  sending the retrieved one or more signed attributes from the calling party;
  receiving the one or more signed attributes of the calling party;
  validating signatures of the one or more signed attributes responsive to receiving the one or more signed attributes of the calling party;
  comparing the one or more attributes of the one or more validated signed attributes to one or more rules specified by the called party;
  allowing a telephony device of the called party to provide a user discernible indication of the phone call, responsive to determining the one or more attributes meet conditions specified by the one or more rules; and
  blocking the phone call, responsive to determining the one or more attributes do not meet conditions specified by the one or more rules.

9. The method as recited in claim 8, further comprising:
  preventing a phone number of the calling party from being shared with the called party; and
  identifying the calling party based on the one or more attributes without using the phone number of the calling party.

10. The method as recited in claim 8, further comprising validating the signatures of the one or more signed attributes by decrypting the signatures.

11. The method as recited in claim 8, wherein prior to generating the request to establish a phone call from the calling party to the called party, the method further comprises:
  validating an identity of the calling party;
  allowing the calling party to select which attributes to expose to the called party; and
  allowing the calling party to block at least one attribute from being exposed to the called party.

12. The method as recited in claim 11, wherein a third party entity is configured to sign the one or more attributes responsive to validating the identity of the calling party.

13. The method as recited in claim 8, further comprising generating a user interface to allow the called party to specify the one or more rules for applying to incoming phone calls.

14. The method as recited in claim 13, wherein the one or more rules comprise one or more of allowing phone calls from people according to defined categories.

15. A non-transitory computer readable storage medium storing program instructions, wherein the program instructions are executable by a processor to:
  sign one or more attributes of a calling party by generating an encrypted hash of each of the one or more attributes as part of an identity verification process of the calling party;
  store the one or more signed attributes associated with the calling party;
  receive a request to establish a phone call from the calling party to a called party;
  send one or more signed attributes from the calling party;
  receive the one or more signed attributes of the calling party;
  validate signatures of the one or more signed attributes responsive to receiving the one or more signed attributes of the calling party;
  compare the one or more attributes of the one or more validated signed attributes to one or more rules specified by the called party;
  allow a telephony device of the called party to provide a user discernible indication of the phone call, responsive to determining the one or more attributes meet conditions specified by the one or more rules; and
  block the phone call, responsive to determining the one or more attributes do not meet conditions specified by the one or more rules.

16. The non-transitory computer readable storage medium as recited in claim 15, wherein the program instructions are further executable by a processor to:
  prevent a phone number of the calling party from being shared with the called party; and
  identify the calling party based on the one or more attributes without using the phone number of the calling party.

17. The non-transitory computer readable storage medium as recited in claim 15, wherein the program instructions are further executable by a processor to validate the signatures of the one or more signed attributes by decrypting the signatures.

18. The non-transitory computer readable storage medium as recited in claim 15, wherein prior to generating the request to establish a phone call from the calling party to the called party, the program instructions are executable by a processor to:
  validate an identity of the calling party;
  allow the calling party to select which attributes to expose to the called party; and
  allow the calling party to block at least one attribute from being exposed to the called party.

19. The non-transitory computer readable storage medium as recited in claim 18, wherein a third party entity is configured to sign the one or more attributes responsive to validating the identity of the calling party.

20. The non-transitory computer readable storage medium as recited in claim 15, wherein the program instructions are further executable by a processor to generate a user interface to allow the called party to specify the one or more rules for applying to incoming phone calls.

* * * * *